(12) United States Patent
Lavallee (10) Patent No.: US 9,314,973 B2
(45) Date of Patent: Apr. 19, 2016

(54) SHIPPING STRUCTURE AND METHODS OF MAKING AND USING SAME

(76) Inventor: Dean Lavallee, Jupiter, FL (US)

(*) Notice: Subject to any disclaimer, the term of this patent is extended or adjusted under 35 U.S.C. 154(b) by 697 days.

(21) Appl. No.: 13/493,780

(22) Filed: Jun. 11, 2012

(65) Prior Publication Data

US 2012/0315415 A1 Dec. 13, 2012

Related U.S. Application Data

(60) Provisional application No. 61/495,588, filed on Jun. 10, 2011.

(51) Int. Cl.
| | | |
|---|---|---|
| *B29C 67/24* | (2006.01) | |
| *B65D 81/00* | (2006.01) | |
| *B65D 81/02* | (2006.01) | |
| *B65D 81/18* | (2006.01) | |
| *C08L 91/06* | (2006.01) | |

(52) U.S. Cl.
CPC ............ *B29C 67/241* (2013.01); *B65D 81/00* (2013.01); *B65D 81/02* (2013.01); *B65D 81/18* (2013.01); *C08L 91/06* (2013.01); *Y10T 428/131* (2015.01)

(58) Field of Classification Search
CPC ........ B65D 81/00; B65D 81/02; B65D 81/18; C08L 91/06; Y10T 428/131
See application file for complete search history.

(56) References Cited

U.S. PATENT DOCUMENTS

| | | | |
|---|---|---|---|
| 3,354,022 A | * | 11/1967 | Johnson, Jr. et al. ......... 428/167 |
| 4,557,772 A | | 12/1985 | Crist, Jr. |
| 2008/0098935 A1 | | 5/2008 | Roth et al. |

FOREIGN PATENT DOCUMENTS

| | | |
|---|---|---|
| JP | 7242225 A | 9/1995 |
| JP | 10072033 | 3/1998 |
| JP | 2002179894 | 6/2002 |

OTHER PUBLICATIONS

International Search Report and the Written Opinion of the ISA mailed on Feb. 15, 2013 in International Application No. PCT/US2012/041944, International Filing Date Jun. 11, 2012. (12 pages).

* cited by examiner

*Primary Examiner* — Michael C Miggins
(74) *Attorney, Agent, or Firm* — Shutts & Bowen LLP (57) ABSTRACT

A shipping structure is formed from a mixture of small pieces of tumbled glass. The shipping structure can incorporate a wick element to allow the shipping structure to function as a candle. The glass and wax may be from post-consumer materials. The shipping structure can be chilled for use in shipping of materials where cooling of shipped materials will be beneficial. Multiple shipping structures can be combined to house or shield shipped items within a container.

12 Claims, 10 Drawing Sheets

FIG. 12

SHIPPING STRUCTURE AND METHODS OF MAKING AND USING SAME

CROSS-REFERENCE TO RELATED APPLICATION

This application claims priority to U.S. Provisional Application No. 61/495,588, filed Jun. 10, 2011, which is entirely incorporated by reference herein.

FIELD

The present technology relates generally to making and using shipping or transportation packing materials. In particular, the technology relates to methods of manufacturing and using shipping structures composed of post-consumer materials such as glass or wax, or both.

BACKGROUND

When shipping or transporting items, it can be beneficial to include packing or shipping materials or structures within a shipping container to protect and shield shipped items. Often packing materials are constructed of non-recycled materials. At least one implementation of the technology overcomes this problem by constructing packing or shipping materials which are made of recycled glass or wax. At least one further implementation of the technology enables a packing or shipping material to be used for other purposes, such as lighting or heating or both.

Disclosed herein are methods of making and using shipping structures made from recycled materials.

DETAILED DESCRIPTION

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood that the implementations described herein can be practiced without these specific details. In other instances, methods, procedures and components have not been described in detail so as not to obscure the related relevant feature being described. It will be understood that the descriptions herein are not to be considered as limiting the scope of the implementations described or the appended claims.

The technology includes methods, uses and implementations of one or more mixtures of glass material and wax material formed in shapes making them suitable for packing material. At least one mixture within the technology may be cooled for use in packing material for packing or shipping of cooled items.

Several definitions that apply throughout the disclosure of the technology will now be presented. A "mold" is defined as a component that contains one or more cavities or channels for accepting and giving a particular shape to something in a molten state. "Mold" can refer to a hollowed-out block that is to be filled with a liquid such as plastic, glass, or metal. The liquid hardens or sets inside the mold, adopting its shape. Packing and shipping materials can be formed using one or more molds.

"Injection molding" can refer to a manufacturing process for producing parts from both thermoplastic and thermosetting plastic materials. In injection molding, material is fed into a heated barrel, mixed, and forced into a mold cavity where it cools and hardens to the configuration of the mold cavity. A mold can have two primary components, an injection mold and an ejector mold. Plastic resin enters the mold through a sprue in the injection mold, whereby a sprue bushing is sealed against a nozzle of the injection barrel of the molding machine. The sprue can enable molten plastic to flow from the barrel into the mold, which can also be called a cavity. The sprue bushing directs the molten plastic into the cavity through channels that are machined into the faces of the injection mold and the ejector mold.

The terms "metal" or "metal component" are defined as any element or alloy that readily becomes a cation and forms ionic bonds, having relatively free valence electrons and that is able to conduct electricity. The term "image" is defined as a physical likeness or representation of a person, animal or thing that is capable of being displayed on a plastic surface. The terms "plastic" or "plastic component" mean any substance made of one or more polymers that is capable of being shaped or molded when subjected to heat and pressure. A "nozzle" is defined as a component that has an opening and that directs the flow of a fluid. The term "housing" is defined as any structure that is designed to cover or protect any component. The phrases "embedded in," "embedded within" and "integrated with" are defined as a state in which one element is at least partially surrounded by another element with at least one surface of the partially surrounded element exposed. "Wax" can refer to a class of chemical compounds that are plastic (malleable) near ambient temperatures. Characteristically, they melt above 45° C. (113° F.) to give a low viscosity liquid. Waxes are insoluble in water but soluble in organic, nonpolar solvents. Waxes are organic compounds, both synthetic and naturally occurring. Waxes can be used to make candles. "Plastic" can refer to any material within a wide range of synthetic or semi-synthetic organic solids used in the manufacture of industrial products. Plastics are typically polymers of high molecular mass, and may contain other substances to improve performance and/or reduce production costs. "Glass" can refer to any amorphous (non-crystalline) solid material. Glass, can include soda-lime glass, which is composed of about 75% silica ($SiO_2$) plus $Na_2O$, CaO, and several minor additives. "Tumbling" can include tumble finishing, which is a technique for smoothing and polishing a rough surface on relatively small parts or items, including pieces of glass. The object of tumbling glass is to remove sharp edges from the glass, so that it may be handled safely. Tumbled glass can be combined or mixed with other materials. "Candle" can refer to is a solid block of fuel (including, but not limited to, wax) and an embedded wick, which can be lit to provide light or heat or both.

As noted earlier, it can be advantageous to form shipping materials out of mixtures of glass and wax. Many shipping materials are constructed from non-recycled material such as Styrofoam™. Glass and wax are produced for use in many non-reused items, bottles being one example, crayons being another. The implementations of the technology take materials such as glass and wax that would otherwise be discarded and ultimately placed in a land-fill, and combine them to create shipping or packaging materials. The shipping or packaging materials implemented within the technology may be configured to include wicks, enabling them to also be used as candles. In some implementations of the technology, the shipping or packing material can be cooled to very low temperatures, thus enabling them to be used in the shipping of items which require a low temperature. Some implementations of the technology can be used to cool products for shipping in situations wherein space or volume of the shipping container is a limiting factor.

Reference will now be made in detail to implementations of the technology. Each example is provided by way of explanation of the technology only, not as a limitation of the technology. It will be apparent to that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
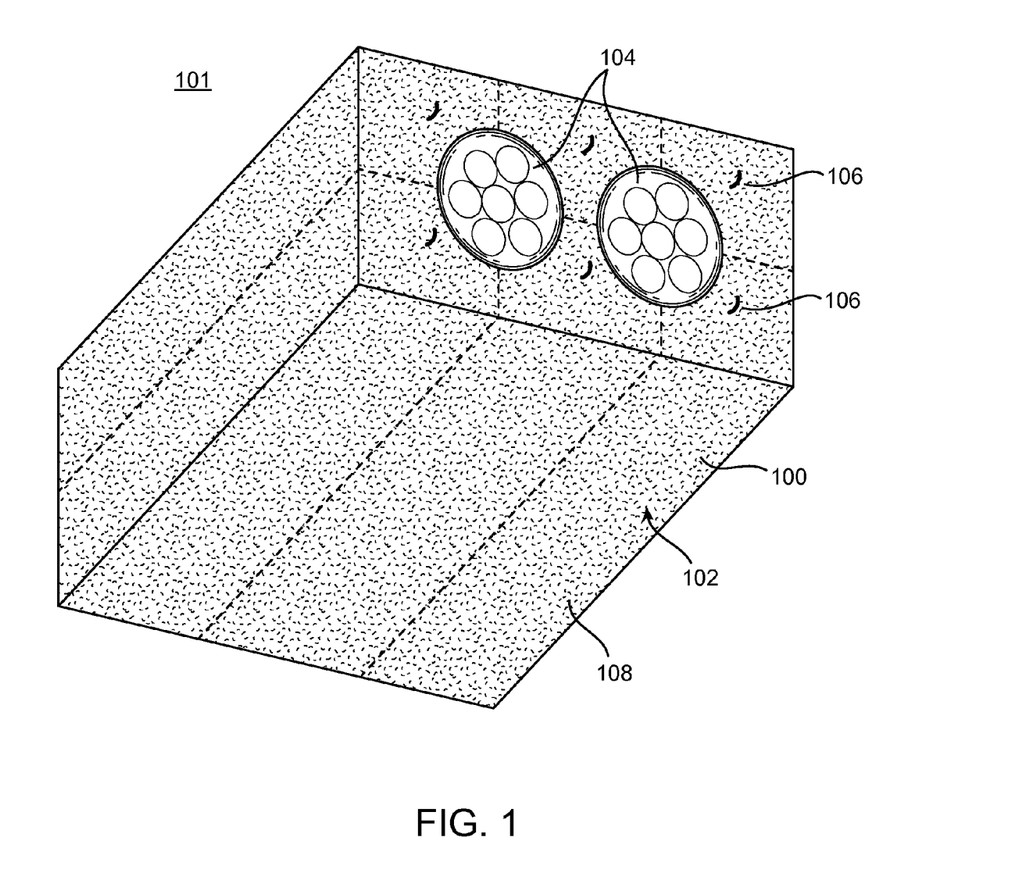
FIG. 1 illustrates a shipping configuration within the technology.

Referring to FIG. 1, a shipping configuration 101 is illustrated. FIG. 1 and the other figures illustrate non-limiting examples, and modifications may be necessary to make shipping configuration 101 usable in particular environments. In the illustrated implementation, shipping structures 100 according to the technology are arranged in a shipping configuration 101. Shipping structures 100 may be formed from a mixture including tumbled glass fragments 102 and wax material 108.

With further reference to FIG. 1, six shipping structures 100 formed from a mixture including tumbled glass fragments 102 and wax material 108 are shown arranged about two items 104. The shipping structures 100 can protect the items 104 during transportation insofar as they can act as dampening material. Moreover, the shipping structures 100 can be cooled prior to shipment so as to maintain the shipped items 104 in a low temperature. The shipping structures 100 incorporate wicks 106. The inclusion of wicks within the shipping structures enables them to be further utilized as candles. It has been determined experimentally that the wax and glass mixture within the technology has a greater thermal capacity than water. Therefore, a wax 108 and glass material 102 within the technology can keep shipped items cooler and for longer periods than in situations where ice is used as a packing material.

Figure 2:
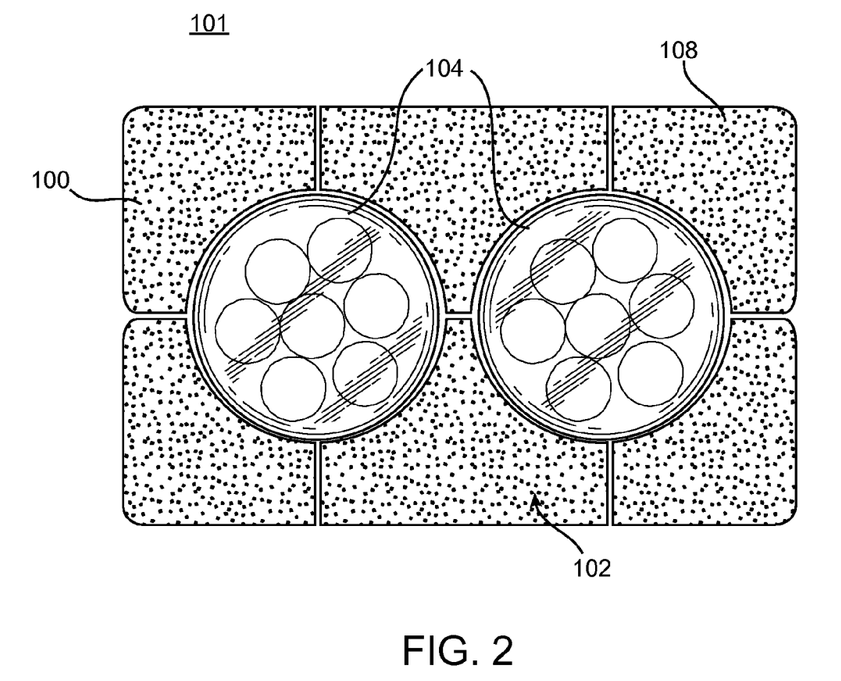
FIG. 2 illustrates a top plan view a shipping configuration within the technology.

FIG. 2 illustrates a top plan view of a shipping configuration composed of six shipping structures 100 configured to house two shipping items 104. As will be appreciated from FIG. 2, the shipping structures 100 within the technology are not necessary configured to contain wicks.

Figure 3:
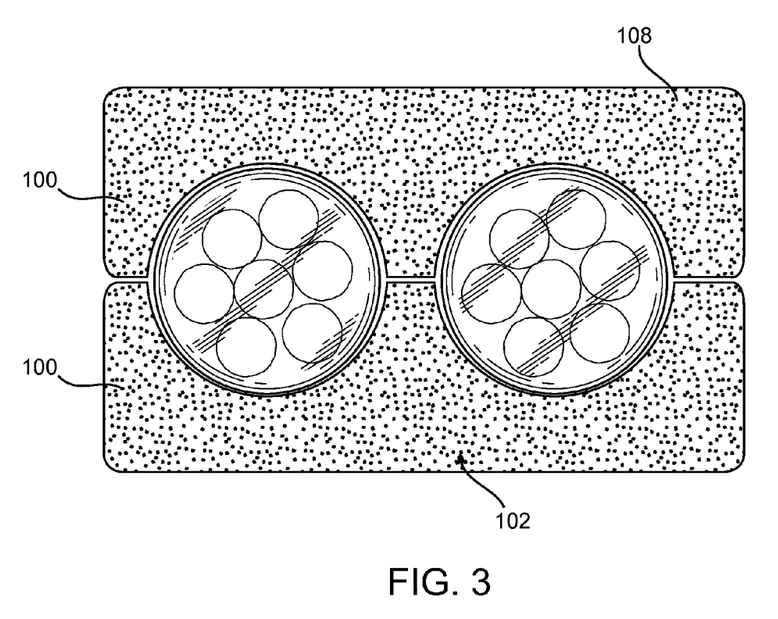
FIG. 3 illustrates a top plan view of an alternate shipping configuration within the technology.

FIG. 3 illustrates a top plan view of a shipping configuration within the technology. Two appropriately formed shipping structures 100 encase two items for shipment, (for example jars containing food). The shipping configuration can be placed in a box or other suitable structure for transportation or shipment. Thus a method of shielding and retaining items for shipment within a shipping configuration (e.g., 101) composed of shipping structures formed from recycled materials is implemented within the technology.

Figure 4:
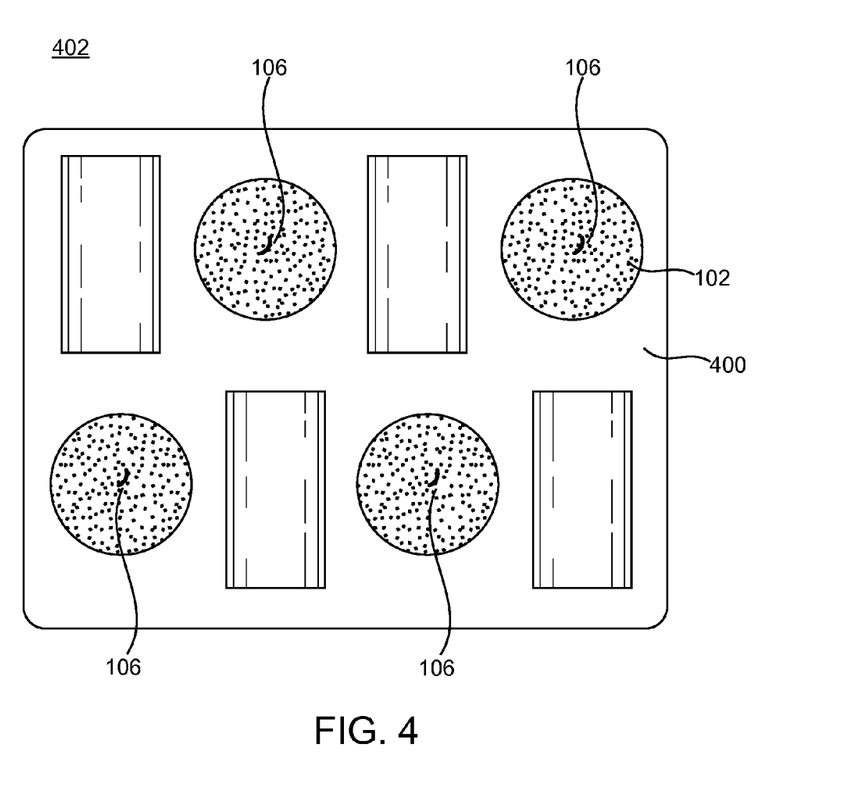
FIG. 4 illustrates a top plan view of an alternate shipping configuration within the technology.

FIG. 4 illustrates an alternate shipping configuration 402 in which shipping structures 100 implemented within the technology in are packed with shipping items 104 within other suitable shipping material such as, for example, biaxially-oriented polyethylene terephthalate or plastic. Shipping configuration 402 can be placed within or housed by an exterior structure such as a wooden, cardboard or metal box or can.

Figure 5:
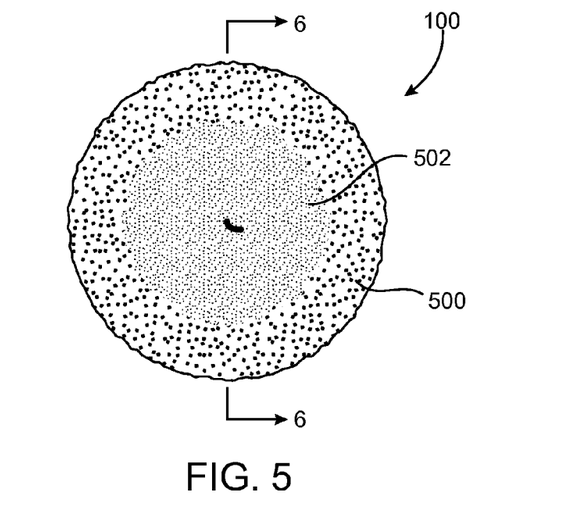
FIG. 5 illustrates a top plan view of a candle configuration of a shipping material within the technology.

FIG. 5 illustrates a top plan view of a shipping structure 100 according to the technology. The exterior portion 500 of the shipping structure can be made from a mixture of tumbled glass and wax material. The interior portion 502 can be made primarily of wax. The shipping structure 100 can include a wick 106 to enable the shipping structure 100 to further function as a candle.

Figures 6, 7:
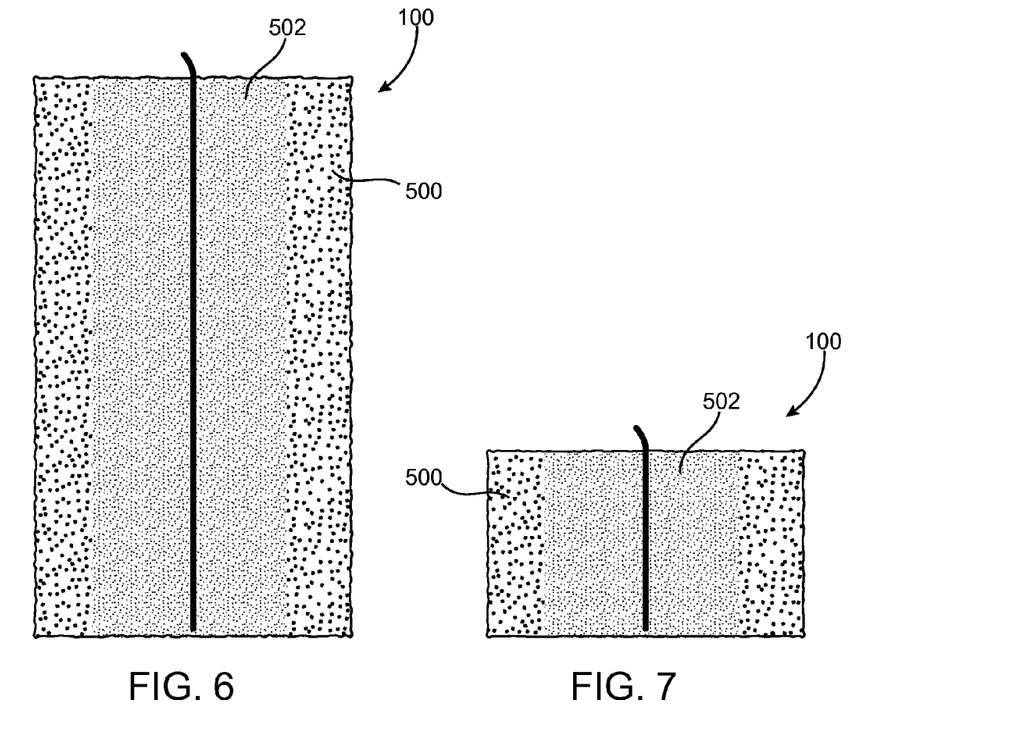
FIG. 6 illustrates a cross-sectional view of the candle configuration of a shipping material illustrated in FIG. 5.
FIG. 7 illustrates an alternate cross-sectional view of a candle configuration as illustrated in FIG. 5.

FIG. 6 illustrates a cross-sectional view AA of the shipping structure 100 illustrated in FIG. 5. A wick 106 is shown running the length of the interior of the shipping structure 100. The interior portion 502 is made from a material consisting primarily of wax. The exterior portion 500 is made from a mixture composed of tumbled glass and wax.

FIG. 7 illustrates an alternate cross-sectional view AA of the shipping structure 100 illustrated in FIG. 5. A wick 106 is shown running the length of the interior of the shipping structure 100. Again, the interior portion 502 is made from a material consisting primarily of wax, and the exterior portion 500 is made from a mixture composed of tumbled glass and wax.

Figure 8:
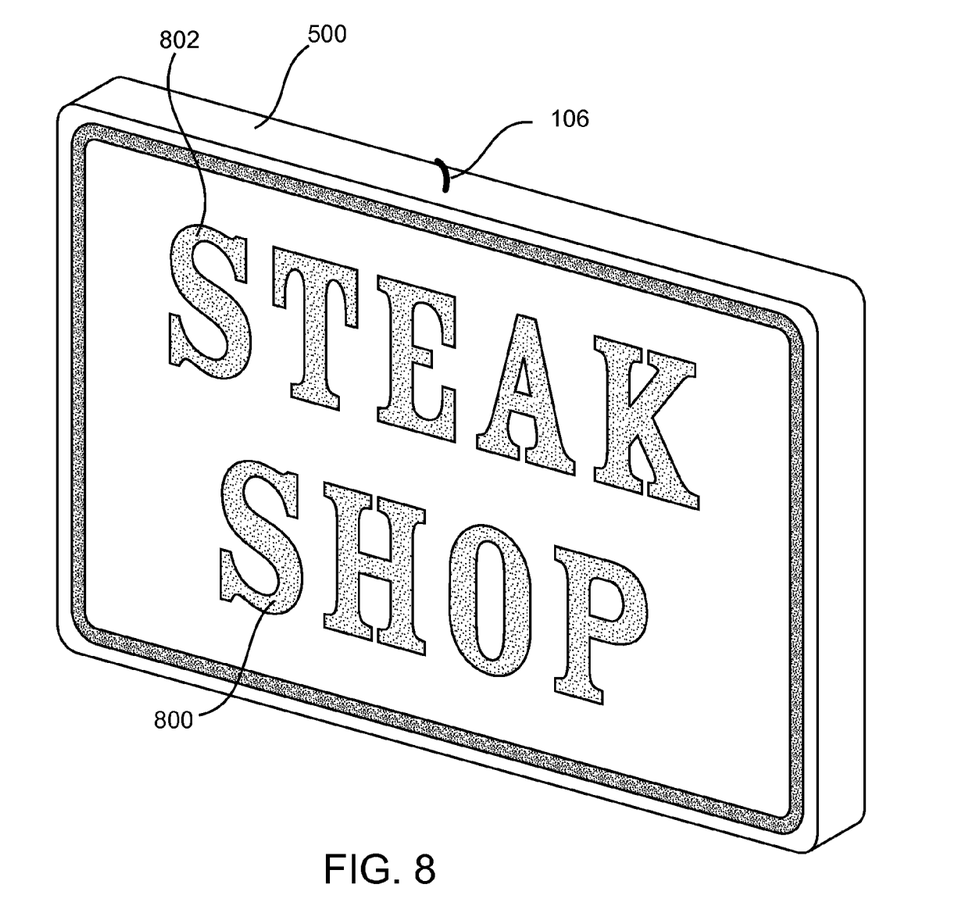
FIG. 8 illustrates a shipping apparatus within the technology.

FIG. 8 illustrates an alternate shipping structure 100 composed at least of glass and wax within the technology. Shipping structure 100 incorporates at least one wick which enables the shipping structure to be further utilized as a candle. Shipping structure 500 comprises a decoration 800, which may be lettering, as shown. The decoration 800 may be formed from paint or other suitable material, or may be formed from colored wax which is placed in a cavities formed in the shipping structure 100. The decoration 800 may also be formed from material including colored glass. The decoration 800 may also consist of cavities formed in the shipping structure 100 through application to the shipping structure 100 of a heated element which causes the contacted area 802 to partially melt or partially evaporate, or both.

Figure 9:
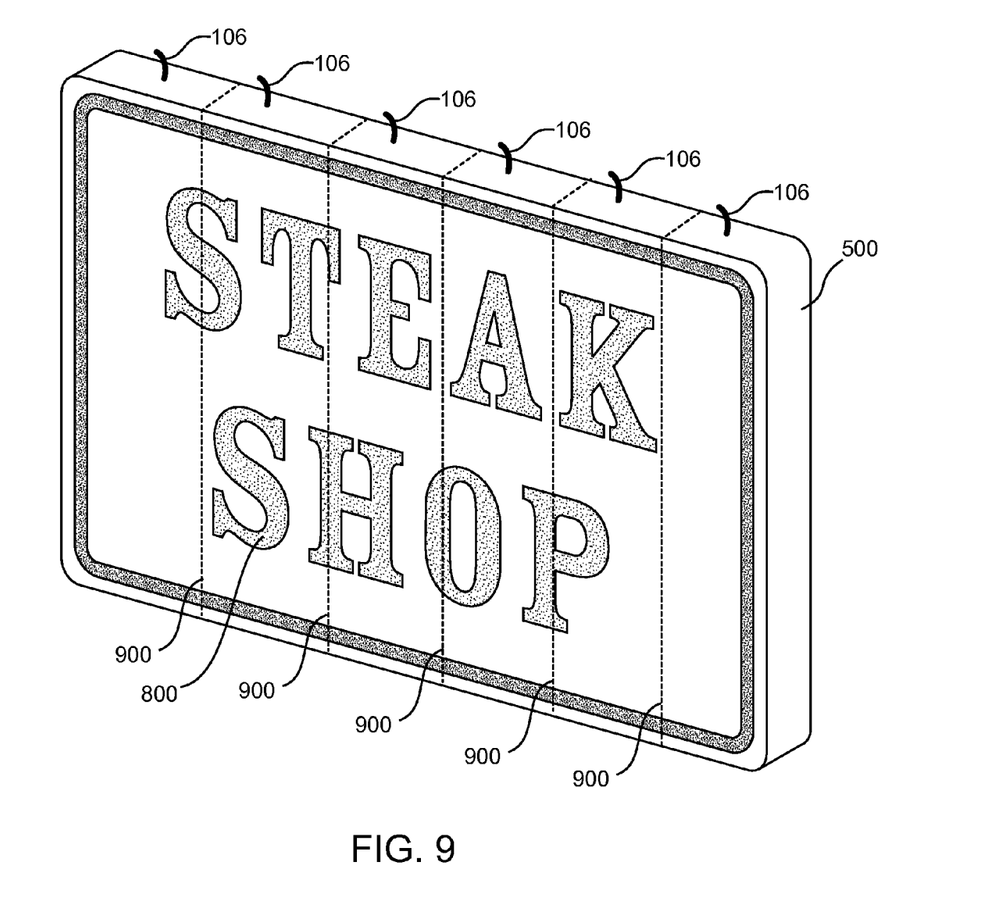
FIG. 9 illustrates an alternate shipping apparatus within the technology.

FIG. 9 illustrates another alternate shipping structure 500 composed at least of glass and wax within the technology, similar to the shipping structure 100 illustrated in FIG. 8. The shipping structure depicted in FIG. 9, however, is scored 900 or perforated to enable the shipping structure to be separated for use as multiple candles. Each "candle" therefore includes its own wick 106.

Figure 10:
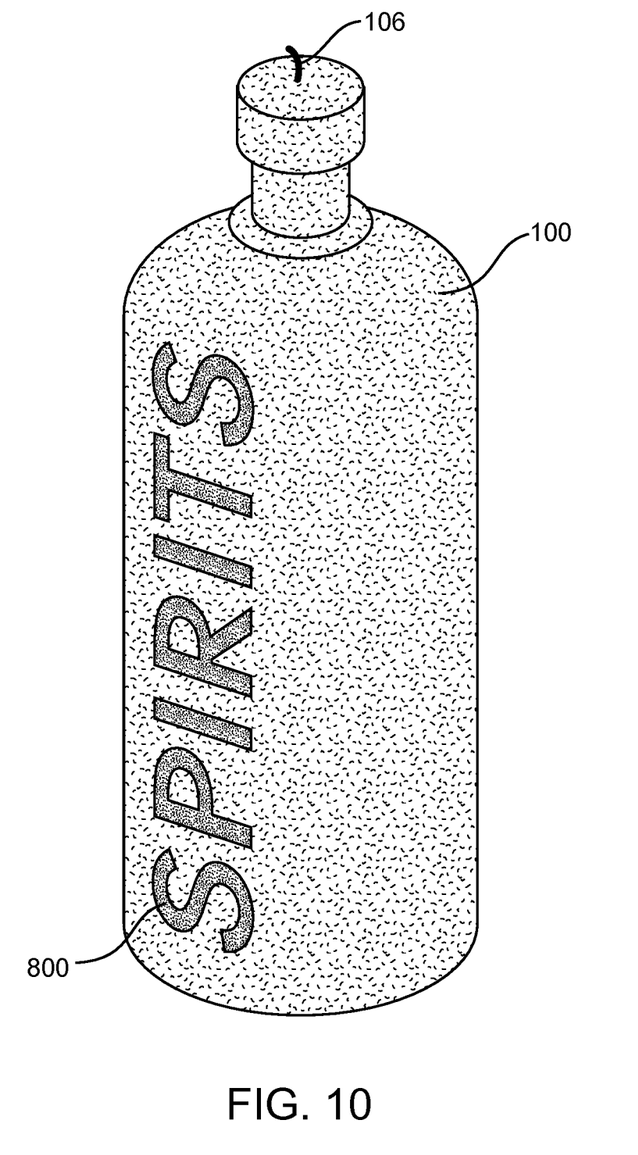
FIG. 10 illustrates an alternate shipping apparatus within the technology.

FIG. 10 illustrates a shipping structure 100 according to the technology formed in the shape of a bottle. The shipping structure 100 contains a decoration portion 800 according to the description above. As shown in the other figures, the shipping structure is constructed of a mixture containing at least wax and pieces of glass. The shipping structure 100 illustrated in FIG. 10 contains a wick element, which allows the shipping structure to act as a candle.

Figure 11:
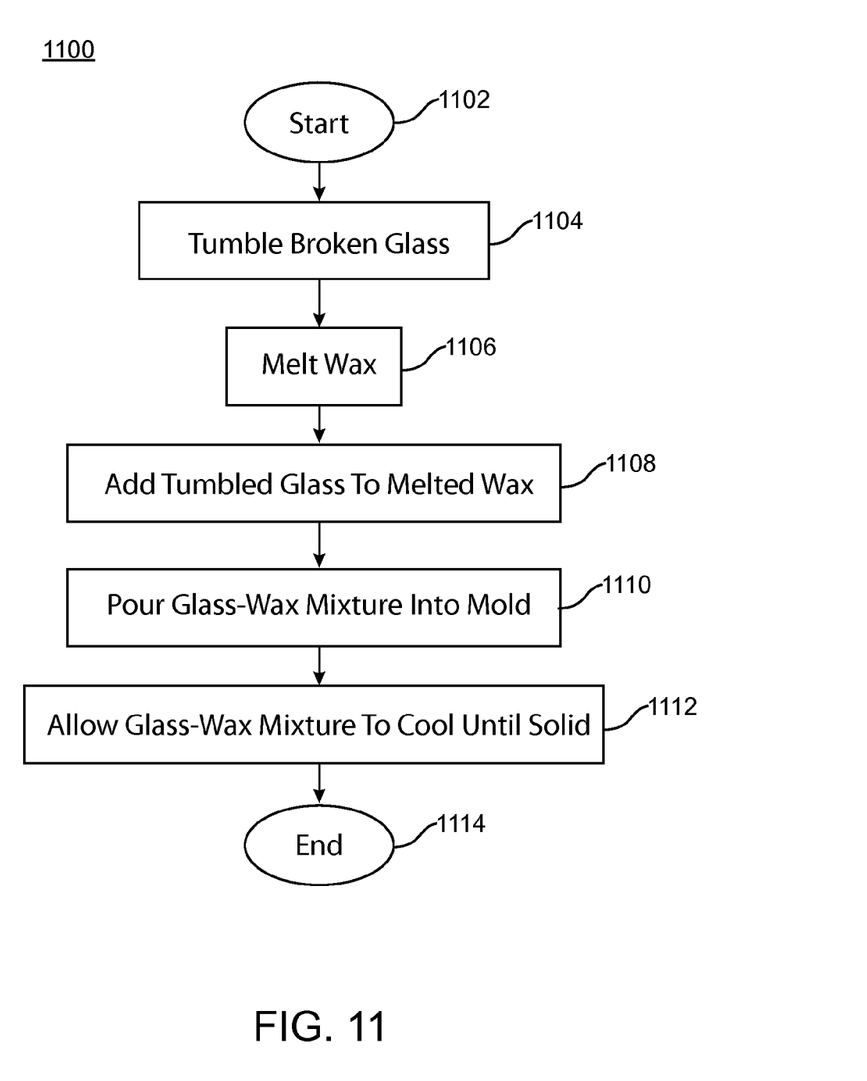
FIG. 11 illustrates a method in accordance with the technology.

FIG. 11 illustrates a method 1100 in accordance with the technology. As intimated above, the method 1100 involves providing tumbling 1104 or smoothing pieces of glass or other suitable material. The method further involves melting wax 1106 from wax materials, which may be, for example crayons. Small pieces of suitably treated glass are mixed 1108 with melted wax and possibly other suitable materials to form a wax-glass mixture. The wax-glass mixture can be shaped by a molding process 1110. The wax-glass mixture can be allowed to cool 1112 until it forms a solid. The solid is then suitable for use as a shipping structure 100. If desired, the shipping structure can be fashioned to include a wick during the molding process. The incorporated wick can enable the shipping structure to function as a candle for lighting or heating or both.

Figure 12:
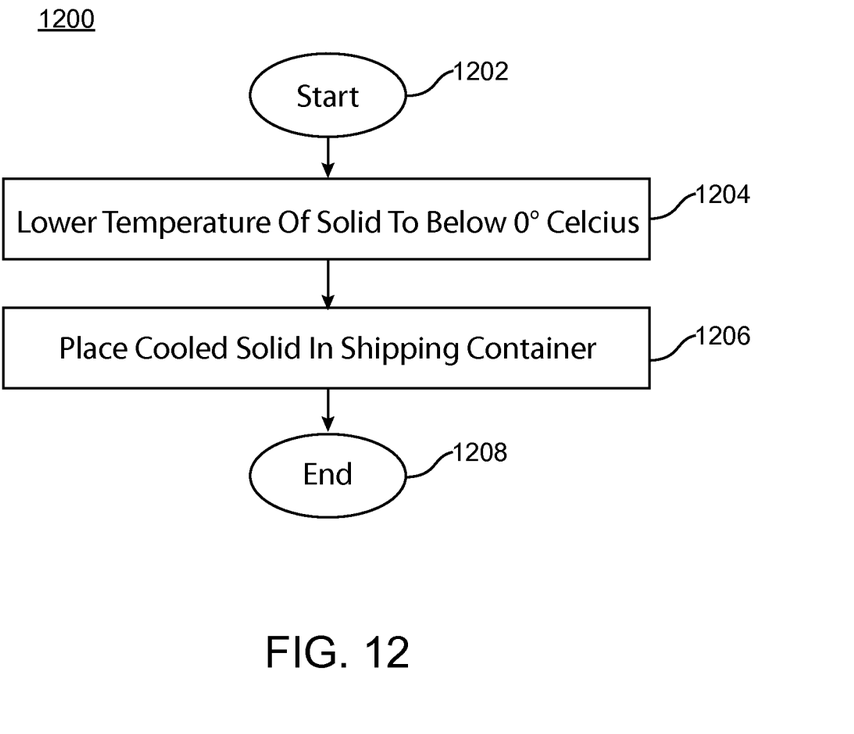
FIG. 12 illustrates an alternate method within the technology.

FIG. 12 illustrates another method 1100 in accordance with the technology. The method 1100 involves cooling 1202 a shipping structure 100 within the technology. As noted above, a shipping structure 100 comprised of wax and glass according to the technology acts as a superior cooled shipping material. The method involves the further step of placing 1204 the appropriately cooled shipping material within an appropriate shipping container to protect and maintain a shipped item in a cooled state.

The technology includes a method of manufacturing a shipping structure, which comprises causing a quantity of wax to melt via heat; tumbling at least one piece of glass; combining the melted wax and the at least one piece of tumbled glass in a liquid mixture; and subsequently allowing the mixture to cool until it is substantially solid. The technology includes a shipping structure manufactured according to the method described above.

A mixture used to form a shipping structure within the technology can be composed of at least 80 percent wax by weight and at least 10 percent glass pieces by weight. Additionally, a mixture used to form a shipping structure within the technology can be composed of at least 20 percent glass pieces by weight. Furthermore, a shipping structure manufactured according to the technology can be composed of at least 25 percent glass pieces by weight.

The implementations, examples and descriptions set forth above should in no way be considered as limiting the subject matter of the following claims.

The invention claimed is:

1. A method of manufacturing a shipping structure, comprising:
    causing a quantity of wax to melt via heat;
    tumbling at least one piece of glass;
    combining the melted wax and the at least one piece of tumbled glass in a liquid mixture; and
    allowing the mixture to cool until it is substantially solid.

2. The method of claim 1, further comprising inserting a wick into the liquid mixture.

3. The method of claim 1, further comprising pouring the liquid mixture into at least one mold cavity.

4. The method of claim 1, further comprising injecting the liquid mixture into at least one mold cavity while leaving at least one cavity configured to receive a candle.

5. The method of claim 1, further comprising decorating the solid with paint.

6. The method of claim 1, further comprising decorating the solid with a material comprising wax and glass.

7. The method of claim 6, wherein the wax is colored.

8. The method of claim 6, wherein the glass is colored.

9. The method of claim 1, further comprising lowering the temperature of the solid mixture below zero degrees Celsius.

10. The method of claim 9, further comprising placing the solid mixture adjacent a shipping item and placing the solid mixture and the shipping item into a shipping container.

11. The method of claim 1, further comprising the steps of repeating the steps to manufacture at least one additional solid shipping structure; housing a shipping item with the solid shipping structure and the at least one additional shipping structure and placing the housed shipping item with the solid shipping structure and the at least one additional shipping structure in shipping container.

12. The method of claim 11, further comprising the step of cooling the solid shipping structure and the at least one additional solid shipping structure below zero degrees Celsius before the step of housing a shipping item.

* * * * *